United States Patent
Lee et al.

(10) Patent No.: US 10,794,267 B2
(45) Date of Patent: Oct. 6, 2020

(54) SYSTEM FOR CORRECTING TURBO LAG

(71) Applicants: Hyundai Motor Company, Seoul (KR); Kia Motors Corporation, Seoul (KR)

(72) Inventors: Joon Myung Lee, Seoul (KR); Sung Soo Kim, Incheon (KR); Kyoung Ik Jang, Yongin-si (KR); Jeon Jin Park, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/394,638

(22) Filed: Apr. 25, 2019

(65) Prior Publication Data

US 2020/0158008 A1   May 21, 2020

(30) Foreign Application Priority Data

Nov. 20, 2018  (KR) .......................... 10-2018-0143591

(51) Int. Cl.
| | | |
|---|---|---|
| *F02B 37/10* | (2006.01) | |
| *F02B 39/12* | (2006.01) | |
| *F02B 37/16* | (2006.01) | |
| *F02M 35/04* | (2006.01) | |

(52) U.S. Cl.
CPC ............ *F02B 37/10* (2013.01); *F02B 37/164* (2013.01); *F02B 39/12* (2013.01); *F02M 35/04* (2013.01)

(58) Field of Classification Search
CPC .......... F02B 21/00; F02B 29/02; F02B 33/44; F02B 37/00; F02B 37/10; F02B 37/14; F02B 37/164; F02B 35/04; Y02T 10/144; F02D 41/0007; F02D 41/0025; F02D 2200/0406; F02D 2200/1002
See application file for complete search history.

(56) References Cited

U.S. PATENT DOCUMENTS

| | | | | |
|---|---|---|---|---|
| 4,962,745 A | * | 10/1990 | Ohno ..................... | F01M 11/08 123/533 |
| 2011/0005505 A1 | * | 1/2011 | Ulrey ..................... | F02B 21/00 123/585 |
| 2012/0079823 A1 | | 4/2012 | Son et al. | |
| 2014/0305413 A1 | * | 10/2014 | Ahrns ..................... | F02B 37/04 123/562 |
| 2016/0123334 A1 | * | 5/2016 | King ..................... | F04D 25/024 415/148 |

FOREIGN PATENT DOCUMENTS

KR   20120033829 A   4/2012

* cited by examiner

*Primary Examiner* — Jesse S Bogue
*Assistant Examiner* — Loren C Edwards
(74) *Attorney, Agent, or Firm* — Slater Matsil, LLP

(57) ABSTRACT

A system for correcting turbo lag of a diesel engine vehicle equipped with a turbo charger and a vacuum pump according to the present disclosure may include: a chamber being supplied with an air/oil mixture discharged from the vacuum pump, separating and storing the mixture into air and oil, and including a first valve for spraying the air and a second valve for discharging the oil; an accelerator pedal sensor sensing a depression extent of an accelerator pedal of the vehicle; a first pressure sensor sensing the pressure of the air compressed in the chamber; and a controller controlling the first valve in accordance with the depression extent of the accelerator pedal sensed by the accelerator pedal sensor.

20 Claims, 7 Drawing Sheets

SYSTEM FOR CORRECTING TURBO LAG

CROSS-REFERENCE TO RELATED APPLICATIONS

This application claims priority to Korean Patent Application No. 10-2018-0143591, filed in the Korean Intellectual Property Office on Nov. 20, 2018, which application is hereby incorporated herein by reference.

TECHNICAL FIELD

The present disclosure relates to a system for correcting turbo lag.

BACKGROUND

Most diesel engine vehicles are equipped with a turbo charger. A turbo charger system is a system that increases the amount of air to be suctioned into an intake manifold using a turbo charger connected to the intake manifold and an exhaust manifold. In detail, the turbine of a turbo charger is forcibly rotated by exhaust gas flowing through an exhaust manifold and a compressor connected to the turbine is operated, whereby air is forcibly suctioned into an intake manifold. In other words, according to a turbo charger system, high-temperature high-pressure exhaust gas changes into low-temperature low-pressure exhaust gas while passing through a turbine, so the energy of the exhaust gas is transmitted to a turbine, thereby rotating the turbine.

Meanwhile, turbo lag is unavoidably generated in vehicles equipped with a turbo charger system. The turbo lag means a phenomenon in which desired acceleration performance is not obtained until the turbine of a turbo charger reaches a desired speed when a vehicle is accelerated. Such turbo lag usually occurs when a vehicle is driven at a low speed. In particular, when a turbo charger is applied to an engine with small engine displacement, the fuel efficiency is improved, but turbo lag occurs at low speeds, so drivers feel inconvenience. Therefore, it is required to develop a technology that reduces turbo lag in diesel engine vehicles equipped with a turbo charger.

SUMMARY

The present disclosure relates to a system for correcting turbo lag. Particular examples relate to a system for correcting turbo lag that is able to reduce turbo lag by compressing and keeping air, which is discharged from a vacuum pump mounted on a diesel engine, in a separate chamber and then by spraying the air to a turbo charger or an intake manifold when a vehicle is accelerated.

Embodiments of the present disclosure can solve the above-mentioned problems in the prior art.

In view of the above aspect, a system for correcting turbo lag of a diesel engine vehicle equipped with a turbo charger and a vacuum pump may include a chamber that is supplied with an air/oil mixture discharged from the vacuum pump, separating and storing the mixture into air and oil, and including a first valve for spraying the air and a second valve for discharging the oil. An accelerator pedal sensor senses a depression extent of an accelerator pedal of the vehicle. A first pressure sensor senses the pressure of the air compressed in the chamber. A controller controls the first valve in accordance with the depression extent of the accelerator pedal sensed by the accelerator pedal sensor.

The chamber may further include an air/oil separator that separates the air/oil mixture discharged from the vacuum pump into air and oil.

The bottom of the chamber may be inclined downward to a specific point on the bottom from both sides.

The second valve may be formed at the specific point on the bottom of the chamber and the oil separated by the air/oil separator may collect on the bottom of the chamber.

The first valve may be formed at the turbo charger.

When the depression extent of the accelerator pedal is a predetermined depression extent or more, the controller may open the first valve so that the air compressed and stored in the chamber is sprayed to the turbo charger through the first valve.

The first valve may be connected to the inlet of an intake manifold of the diesel engine.

When the depression extent of the accelerator pedal is a predetermined depression extent or more, the controller may open the first valve so that the air compressed and stored in the chamber is sprayed to the inlet of the intake manifold through the first valve.

The system may further include a second pressure sensor sensing the pressure in the intake manifold, in which the controller may compare pressure sensed by the second pressure sensor with the pressure of the air compressed in the chamber sensed by the first pressure sensor, and may control the first valve not to open when the pressure in the intake manifold is higher.

The second valve may be an electronic control valve or a relief valve.

When the second valve is an electronic control valve, the controller may control the second valve in accordance with the pressure of the air compressed in the chamber sensed by the first pressure sensor.

A one-way valve may be disposed between the first valve and the intake manifold.

According to the present disclosure, it is possible to reduce turbo lag by compressing and storing air discharged from a vacuum pump mounted on a diesel engine in a chamber and then spraying the air to a turbo charger or an intake manifold when a vehicle is accelerated.

Further, according to the present disclosure, it is possible to reduce the amount of blow-by of an engine by using air re-circulated to a blow-by line in the related art for reducing turbo lag, thereby being able to reduce oil consumption.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF ILLUSTRATIVE EMBODIMENTS

A system for correcting turbo lag according to another embodiment of the present disclosure is described in detail hereafter with reference to the accompanying drawings.

Figure 1:
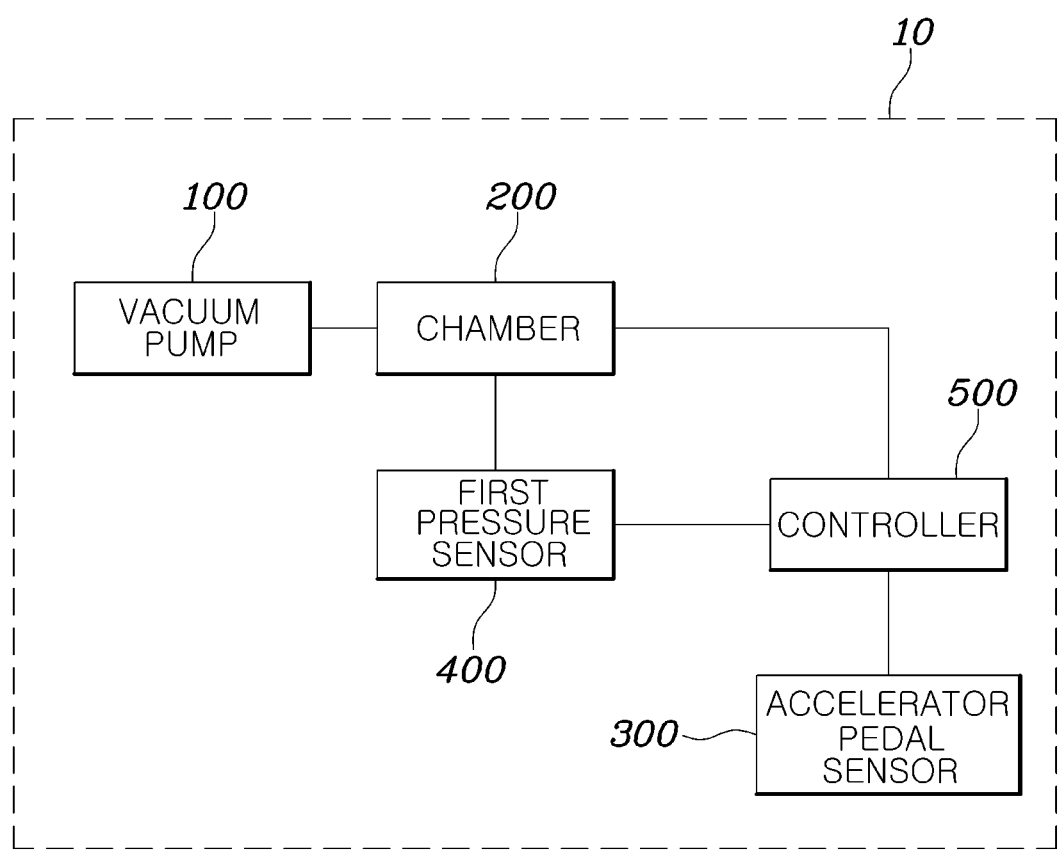
FIG. 1 is a diagram schematically showing the configuration of a system for correcting turbo lag according to an embodiment of the present disclosure.
Figure 2:
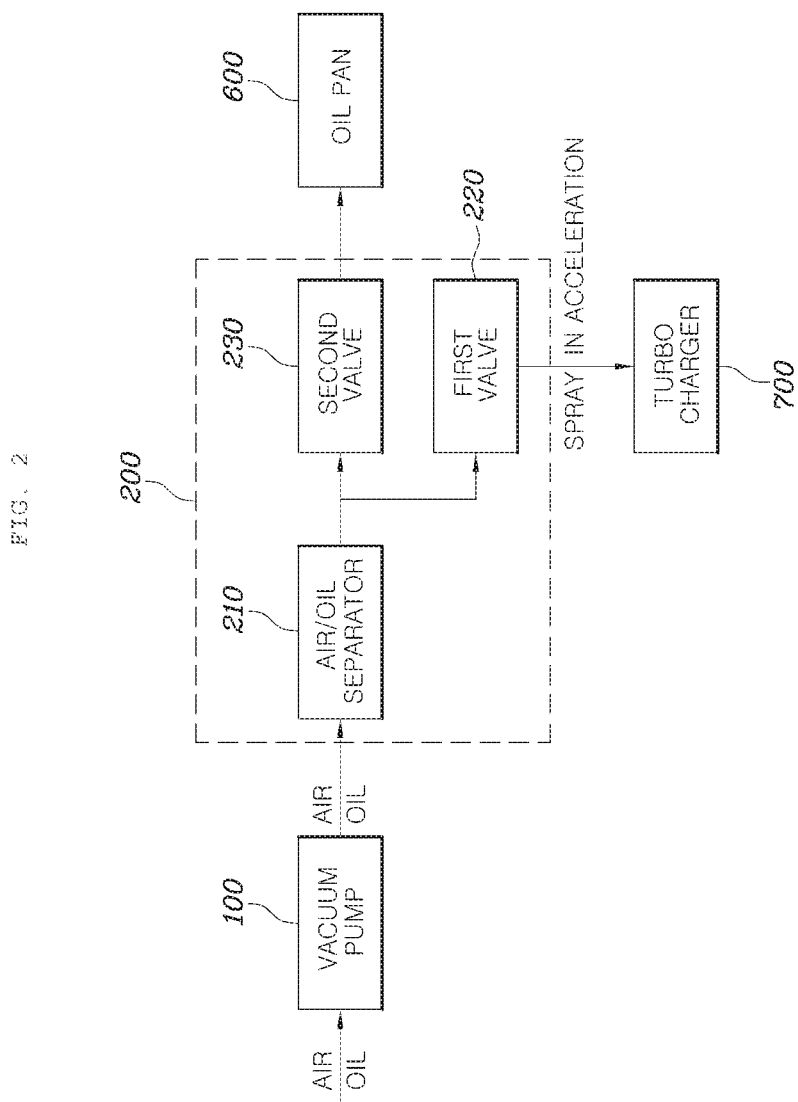
FIG. 2 is a diagram showing flows of air and oil flowing in a vacuum pump in the system for correcting turbo lag according to an embodiment of the present disclosure.
Figure 3:
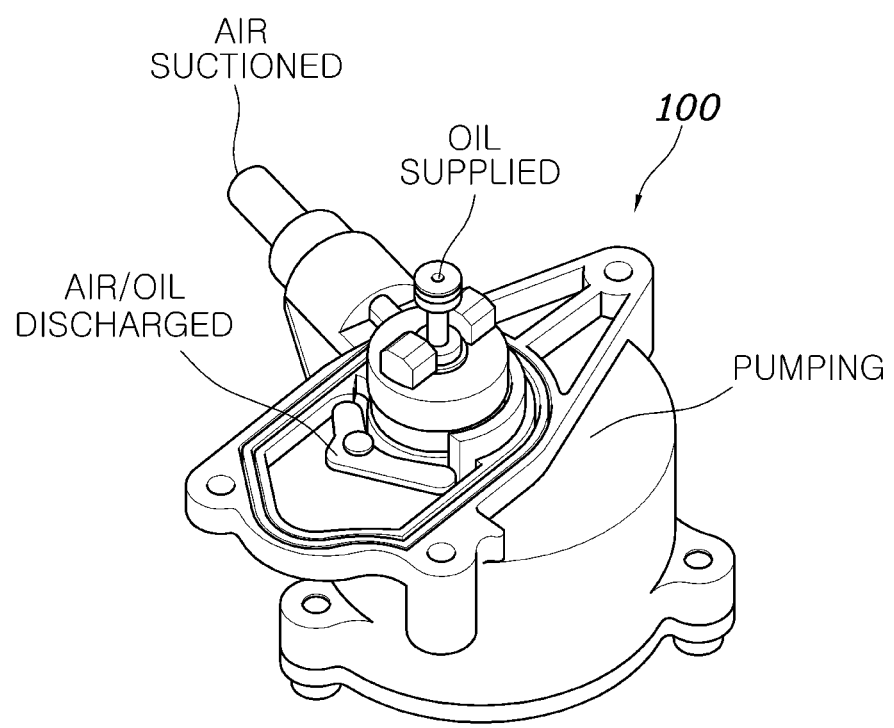
FIG. 3 is a view showing the vacuum pump of the system for correcting turbo lag according to an embodiment of the present disclosure.
Figure 4:
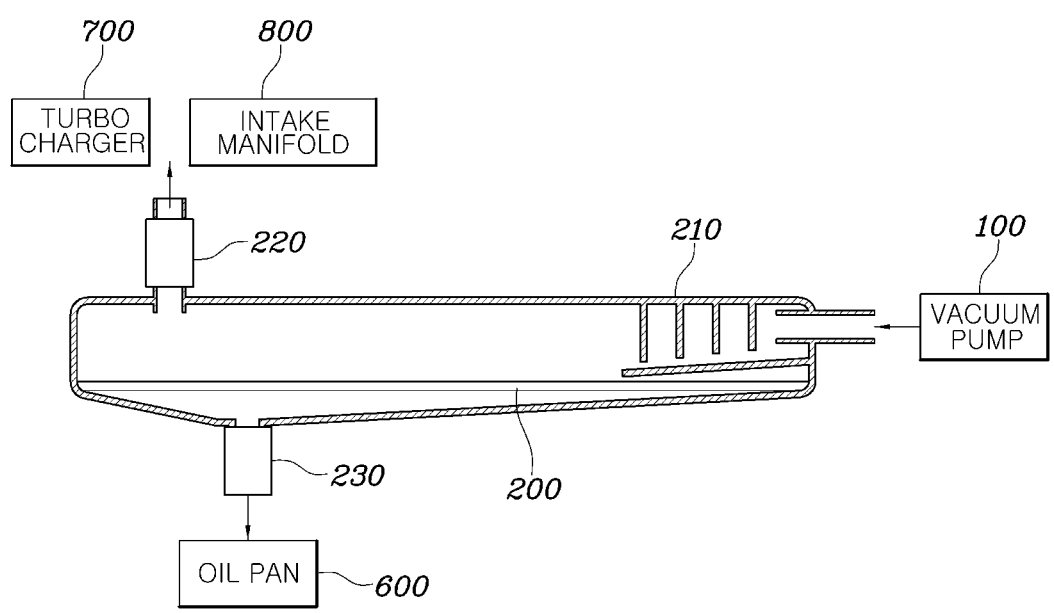
FIG. 4 is a view showing the configuration of a chamber of the system for correcting turbo lag according to an embodiment of the present disclosure.
Figure 5:
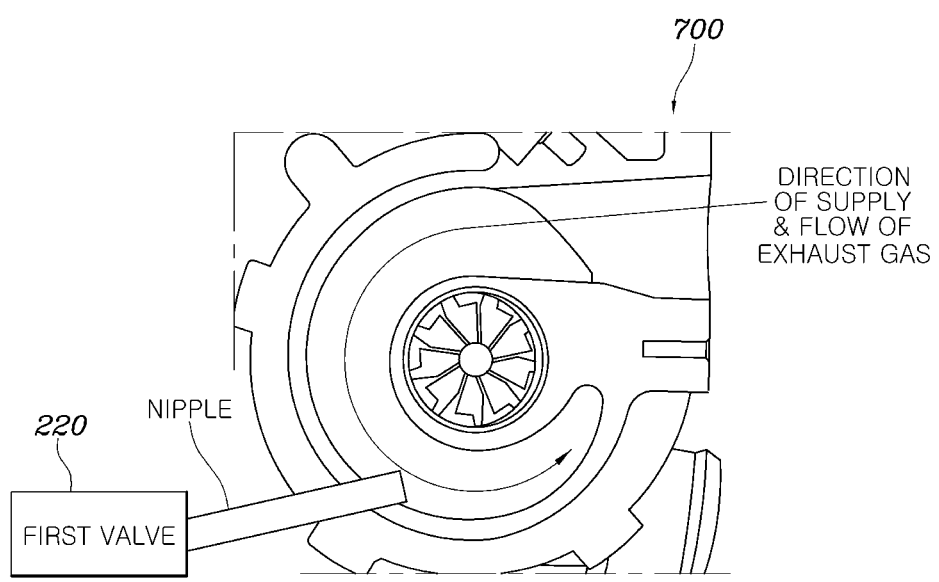
FIG. 5 is a view showing that air compressed in a chamber with a first valve open is sprayed to a turbine housing scroll of a turbo charger when the depression extent of an accelerator pedal is over a predetermined depression extent in the system for correcting turbo lag according to an embodiment of the present disclosure.
Figure 6:
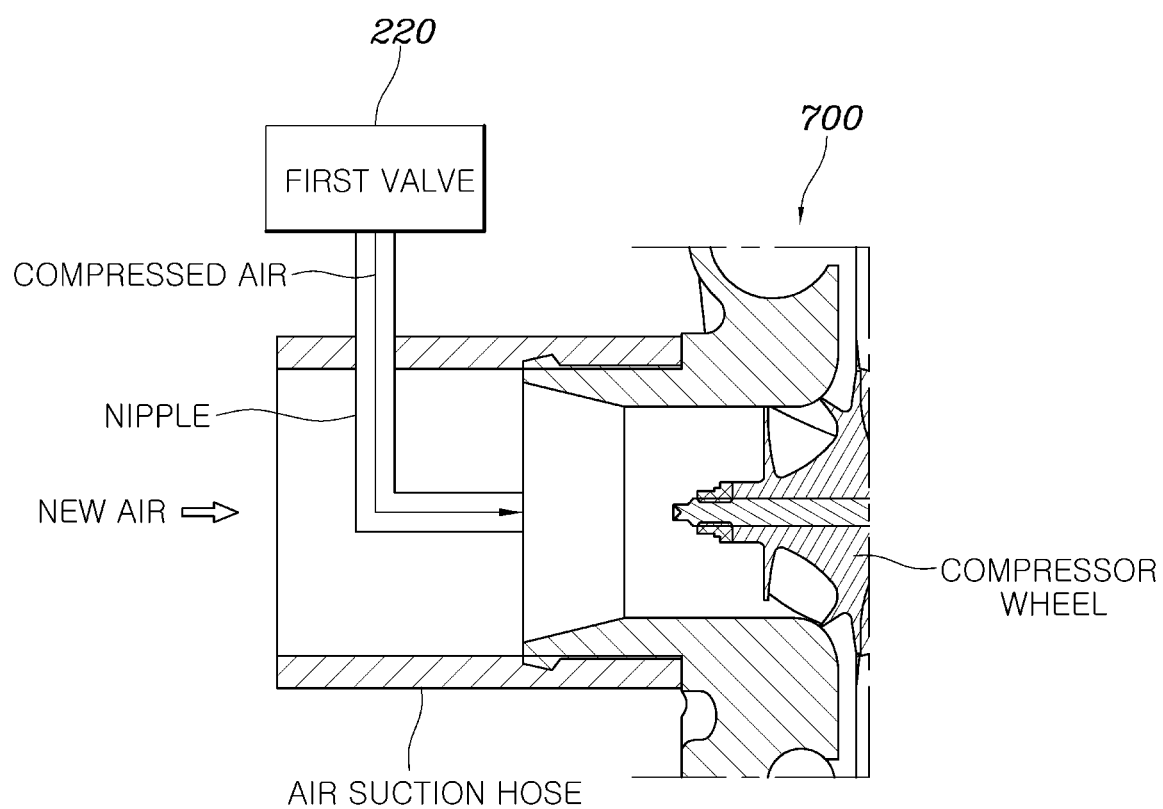
FIG. 6 is a view showing that air compressed in a chamber with a first valve open is sprayed to the front end of an inlet of a compressor of a turbo charger when the depression extent of an accelerator pedal is over a predetermined depression extent in a system for correcting turbo lag according to another embodiment of the present disclosure.
Figure 7:
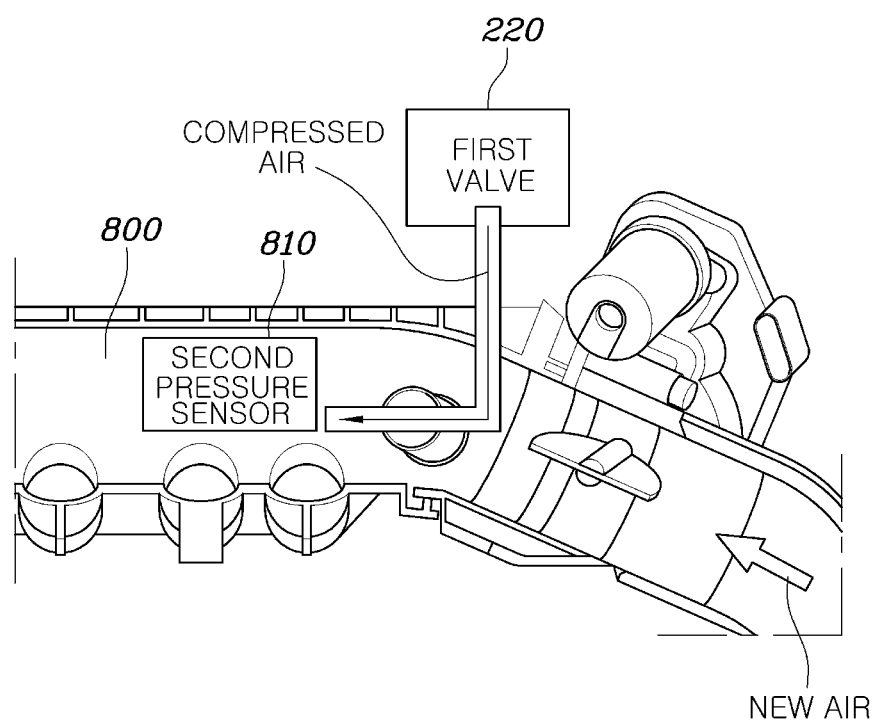
FIG. 7 is a view showing that air compressed in a chamber with a first valve open is sprayed to an inlet of an intake manifold when the depression extent of an accelerator pedal is over a predetermined depression extent in a system for correcting turbo lag according to another embodiment of the present disclosure.

FIG. 1 is a diagram schematically showing the configuration of a system for correcting turbo lag according to an embodiment of the present disclosure, FIG. 2 is a diagram showing flows of air and oil flowing in a vacuum pump, FIG. 3 is a view showing the vacuum pump of the system for correcting turbo lag according to an embodiment of the present disclosure, FIG. 4 is a view showing the configuration of a chamber of the system for correcting turbo lag according to an embodiment of the present disclosure, FIG. 5 is a view showing that air compressed in a chamber with a first valve open is sprayed to a turbine housing scroll of a turbo charger when the depression extent of an accelerator pedal is over a predetermined depression extent in the system for correcting turbo lag according to an embodiment of the present disclosure, FIG. 6 is a view showing that air compressed in a chamber with a first valve open is sprayed to the front end of an inlet of a compressor of a turbo charger when the depression extent of an accelerator pedal is over a predetermined depression extent in a system for correcting turbo lag according to another embodiment of the present disclosure, and FIG. 7 is a view showing that air compressed in a chamber with a first valve open is sprayed to an inlet of an intake manifold when the depression extent of an accelerator pedal is over a predetermined depression extent in a system for correcting turbo lag according to another embodiment of the present disclosure.

As shown in FIG. 1, a system for correcting turbo lag of a diesel engine vehicle 10 equipped with a turbo charger and a vacuum pump may include a chamber 200, an accelerator pedal sensor 300, a first pressure sensor 400, and a controller 500.

In detail, the chamber 200 can be supplied with an air/oil mixture discharged from a vacuum pump 100 and can separate and store the mixture into air and oil. The capacity of the chamber 200 may be set in consideration of the capacity of a brake booster and the compression performance of the vacuum pump 100. The shape of a chamber shown in FIG. 4 is an embodiment and may be changed in various ways, depending on the mounting position of the chamber etc.

In detail, the chamber 200 may include an air/oil separator 210 that separates the air/oil mixture discharged from the vacuum pump 100 into air and oil, a first valve 220 through which air separated by the air/oil separator 210 and the compressed and stored is sprayed, and a second valve 230 through which the separated oil is discharged. The first valve 220 may be formed at a turbo charger 700, depending on embodiments.

In detail, the bottom of the chamber 200, as shown in FIG. 4, may be formed to be inclined downward to a specific point on the bottom from both sides. Since the bottom of the chamber 200 is inclined downward toward a specific point, the oil separated by the air/oil separator 210 can be collected. The second valve 230 may be formed at the specific point on the bottom of the chamber 200 where oil is collected. Since the second valve 230 is formed at the point where the oil separated by the air/oil separator 210 is collected, when the second valve 230 is opened, the oil stored in the chamber 200 can be discharged to an oil pan 600. The second valve 230 is connected to the controller 500 to be described below and can be controlled to be opened and closed by the controller 500. The second valve 230 of the present disclosure may be an electronic control valve or a relief valve. According to an embodiment, when the second valve 230 is an electronic control valve, the second valve 230 can be controlled to be opened and closed by the controller 500 to be described below. According to another embodiment, when the second valve 230 is a relief valve, the second valve 230 can be opened without control by the controller 500 when the pressure in the chamber becomes a predetermined pressure or more.

The accelerator pedal sensor 300 senses the depression extent of the accelerator pedal of a vehicle. Depending on embodiments, the accelerator pedal sensor 300 may be an Accelerator Position Sensor (APS). The accelerator pedal sensor 300 is connected to the controller 500 and can sense the depression extent of the accelerator pedal of a vehicle and transmit the sensed information to the controller 500. The controller 500 can determine whether to open and close the first valve 220, depending on the depression extent of the accelerator pedal by a driver transmitted from the accelerator pedal sensor 300.

The first pressure sensor 400 senses the pressure of air compressed in the chamber 200. The first pressure sensor 400 is connected to the controller 500 and can sense the pressure of the air compressed in the chamber 200 and transmit the sensed information to the controller 500.

The controller 500 can control the first valve 220 in accordance with the depression extent of the accelerator pedal sensed by the accelerator pedal sensor 300 and can control the second valve 230 in accordance with the pressure of the air compressed in the chamber sensed by the first pressure sensor 400. The controller 500 may be an Engine Control Unit (ECU).

In detail, when the depression extent of an accelerator pedal by a driver sensed by the accelerator pedal sensor 300 is over a predetermined depression extent, the controller 500 can open the first valve 220 so that the air compressed and stored in the chamber 200 is sprayed to the turbo charger 700 through the first valve 220. The predetermined depression extent may be reference depression extent information of an accelerator pedal for determining the acceleration moment of a vehicle. In other words, when the depression extent of an accelerator pedal by a user sensed by the accelerator pedal sensor 300 is the predetermined depression extent or more, the controller 500 can determine that the vehicle is being accelerated.

In more detail, when the depression extent of an accelerator pedal by a user sensed by the accelerator pedal sensor 300 is the predetermined depression extent or more, that is, when a vehicle is being accelerated, the controller 500 can open the first valve 220 so that the air compressed in the chamber is sprayed to a turbine housing scroll of the turbo charger 700 through the first valve 220, as shown in FIG. 5. As described above, according to the present disclosure, when the torque of a turbo charger wheel is insufficient due to exhaust gas pressure insufficiently generated at the acceleration moment of a vehicle, the controller 500 opens the first valve 220 so that the air compressed and stored in the chamber 200 is sprayed to the turbine housing scroll of the turbo charger 700 through the first valve 220, thereby helping rotation of the wheel to quickly generate a booster and correspondingly reducing turbo lag.

Further, when the depression extent of an accelerator pedal by a user sensed by the accelerator pedal sensor 300 is the predetermined depression extent or more, that is, when a vehicle is being accelerated, the controller 500 can open the first valve 220 so that the air compressed in the chamber is sprayed ahead of a compressor wheel of the turbo charger through the first valve 220, as shown in FIG. 6. As described above, according to the present disclosure, when the torque of a turbo charger wheel is insufficient due to exhaust gas pressure insufficiently generated at the acceleration moment of a vehicle, the controller 500 opens the first valve 220 so that the air compressed and stored in the chamber 200 is sprayed ahead of the compressor wheel of the turbo charger through the first valve 220, thereby helping rotation of the wheel to quickly generate a booster and correspondingly reducing turbo lag.

On the other hand, according to another embodiment, the first valve 220 may be connected to the inlet of an intake manifold 800 of a diesel engine. Further, when the depression extent of an accelerator pedal by a user sensed by the accelerator pedal sensor 300 is the predetermined depression extent or more, that is, when a vehicle is being accelerated, the controller 500 can open the first valve 220 so that the air compressed and stored in the chamber 200 is sprayed to the inlet of the intake manifold 800 through the first valve 220, as shown in FIG. 7. As described above, according to the present disclosure, when the torque of the wheel of the turbo charger 700 is insufficient due to exhaust gas pressure insufficiently generated at the acceleration moment of a vehicle and accordingly new air is insufficiently supplied to a cylinder (not shown), the controller 500 opens the first valve 220 so that the air compressed and stored in the chamber 200 is sprayed to the inlet of the intake manifold 800 through the first valve 220, whereby air can be sufficiently supplied into the cylinder.

The system for correcting turbo lag of the present disclosure may further include a second pressure sensor 810 that senses the pressure in the intake manifold 800. The second pressure sensor 810 can sense the pressure in the intake manifold 800 and can transmit the sensed information to the controller 500. The controller 500 can compare the pressure information of the intake manifold 800 transmitted from the second pressure sensor 810 with the pressure of the air compressed in the chamber transmitted from the first pressure sensor 400, and can control the first valve 220 not to open when the internal pressure of the intake manifold 800 is higher. That is, when the internal pressure of the intake manifold 800 is high, the controller 500 controls the first valve 220 not to open, thereby being able to prevent backflow of air that may occur when the internal pressure of the intake manifold 800 is higher than the internal pressure of the chamber 200 when the vehicle is accelerated in a high-load period. Depending on embodiments, it is possible to prevent backflow of air by mounting a one-way valve on a nipple connecting the first valve 220 to the intake manifold 800.

Further, when determining that air has been compressed in the chamber 200 over the performance of the vacuum pump 100 on the basis of the pressure information compressed in the chamber 200 transmitted from the first pressure sensor 400, the controller 500 can reduce the internal pressure of the chamber 200 by opening the second valve 230, and in this state, the oil etc. separated and stored in the chamber 200 can be discharged to the oil pan 600 through the second valve 230, as shown in FIG. 2. As describe above, since the controller 500 reduces the pressure in the chamber 200 by opening the second valve 230 when air over the performance of the vacuum pump 100 has been compressed in the chamber 200, it is possible to prevent the problem in that air for operating the brake of a vehicle cannot be suctioned any more and the brake is not operated due to the air having been compressed in the chamber 200 over the performance of the vacuum pump 100.

What is claimed is:

1. A system for correcting turbo lag of a diesel engine vehicle equipped with a turbo charger and a vacuum pump, the system comprising:
   a chamber comprising a top wall and a bottom wall connected by side walls, the chamber having an interior space formed by the top wall, the bottom wall, and the side walls, the chamber to be supplied with an air/oil mixture discharged from the vacuum pump, to separate the air/oil mixture into air and oil and to store the air and the oil within the interior space of the chamber, wherein the chamber includes a first valve for spraying the air and a second valve for discharging the oil and wherein the bottom wall is inclined downward from the side walls to a specific point on the bottom wall such that the oil separated by the chamber can collect at the specific point;
   an accelerator pedal sensor configured to sense a depression extent of an accelerator pedal of the vehicle;
   a first pressure sensor configured to sense pressure of the air compressed in the chamber; and
   a controller configured to control the first valve in accordance with the depression extent of the accelerator pedal sensed by the accelerator pedal sensor.

2. The system of claim 1, wherein the chamber further includes an air/oil separator configured to separate the air/oil mixture discharged from the vacuum pump into the air and the oil.

3. The system of claim 1, wherein the second valve is formed at the specific point on the bottom wall of the chamber.

4. The system of claim 1, wherein the first valve is formed at the turbo charger.

5. The system of claim 4, wherein, when the depression extent of the accelerator pedal is a predetermined depression extent or more, the controller is configured to open the first valve so that the air compressed and stored in the chamber is sprayed to the turbo charger through the first valve.

6. The system of claim 1, wherein the first valve is connected to an inlet of an intake manifold of a diesel engine of the diesel engine vehicle.

7. The system of claim 6, wherein, when the depression extent of the accelerator pedal is a predetermined depression extent or more, the controller is configured to open the first valve so that the air compressed and stored in the chamber is sprayed to the inlet of the intake manifold through the first valve.

8. The system of claim 6, further comprising a second pressure sensor configured to sense pressure in the intake manifold, wherein the controller is configured to compare the pressure sensed by the second pressure sensor with the pressure of the air compressed in the chamber sensed by the first pressure sensor, and to control the first valve not to open when the pressure in the intake manifold is higher than the pressure of the air compressed in the chamber.

9. The system of claim 6, further comprising a one-way valve disposed between the first valve and the intake manifold.

10. The system of claim 1, wherein the second valve is an electronic control valve.

11. The system of claim 10, wherein the controller is configured to control the second valve in accordance with the pressure of the air compressed in the chamber sensed by the first pressure sensor.

12. The system of claim 1, wherein the second valve is a relief valve.

13. A diesel engine vehicle comprising:
- a turbo charger;
- a vacuum pump;
- a chamber comprising a top wall and a bottom wall connected by side walls, the chamber having an interior space formed by the top wall, the bottom wall, and the side walls, the chamber to be supplied with an air/oil mixture discharged from the vacuum pump, to separate the air/oil mixture into air and oil, and to store the air and the oil within the interior space of the chamber, wherein the chamber includes a first valve for spraying the air and a second valve for discharging the oil and wherein the bottom wall is inclined downward from the side walls to a specific point on the bottom wall such that the oil separated by the chamber can collect at the specific point;
- an accelerator pedal sensor configured to sense a depression extent of an accelerator pedal of the vehicle;
- a first pressure sensor configured to sense pressure of the air compressed in the chamber; and
- a controller configured to control the first valve in accordance with the depression extent of the accelerator pedal sensed by the accelerator pedal sensor.

14. The vehicle of claim 13, wherein the second valve is formed at the specific point on the bottom wall of the chamber.

15. The vehicle of claim 13, wherein the first valve is formed at the turbo charger and wherein, when the depression extent of the accelerator pedal is a predetermined depression extent or more, the controller is configured to open the first valve so that the air compressed and stored in the chamber is sprayed to the turbo charger through the first valve.

16. A method for correcting turbo lag of a diesel engine vehicle equipped with a turbo charger and a vacuum pump, the method comprising:
- supplying a chamber with an air/oil mixture discharged from the vacuum pump, wherein the chamber comprises a top wall and a bottom wall connected by side walls, the chamber having an interior space formed by the top wall, the bottom wall, and the side walls, wherein the bottom wall is inclined downward from the side walls to a specific point on the bottom wall;
- separating the air/oil mixture into air and oil;
- storing the air and the oil in the interior space of the chamber, the oil collecting at the specific point on the bottom wall;
- sensing a depression extent of an accelerator pedal of the vehicle;
- sensing pressure of the air stored in the interior space of the chamber; and
- spraying the air stored in the interior space of the chamber, the spraying controlled in accordance with the depression extent of the accelerator pedal.

17. The method of claim 16, further comprising discharging the oil through a valve.

18. The method of claim 16, wherein spraying the air comprises spraying the air to the turbo charger.

19. The method of claim 16, wherein spraying the air comprises spraying the air to an inlet of an intake manifold through a valve.

20. The method of claim 19, wherein storing the air in the interior space of the chamber comprises compressing the air in the chamber, the method further comprising:
- sensing a pressure in the intake manifold;
- comparing the pressure sensed in the intake manifold with a pressure of the air compressed in the chamber; and
- controlling the valve not to open when the pressure in the intake manifold is higher than the pressure of the air compressed in the chamber.

* * * * *